(12) United States Patent
Yang et al.

(10) Patent No.: US 11,403,542 B2
(45) Date of Patent: Aug. 2, 2022

(54) CONTROL METHOD FOR CONVERTING TIME-VARYING SYSTEM INTO TIME-INVARIANT SYSTEM

(71) Applicant: GUANGDONG UNIVERSITY OF TECHNOLOGY, Guangzhou (CN)

(72) Inventors: Zhijun Yang, Guangzhou (CN); Youdun Bai, Guangzhou (CN); Yaobin He, Guangzhou (CN); Xin Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 931 days.

(21) Appl. No.: 16/191,967

(22) Filed: Nov. 15, 2018

(65) Prior Publication Data

US 2020/0065693 A1 Feb. 27, 2020

(51) Int. Cl.
*G06N 7/00* (2006.01)
*G06F 17/13* (2006.01)

(52) U.S. Cl.
CPC .............. *G06N 7/00* (2013.01); *G06F 17/13* (2013.01)

(58) Field of Classification Search
CPC ............ G06N 7/00; G06F 17/13; G05B 11/36
See application file for complete search history.

(56) References Cited

U.S. PATENT DOCUMENTS 7,487,078 B1 2/2009 Phillips et al.
7,529,652 B1 5/2009 Gahinet et al.
8,712,753 B1 4/2014 Gahinet et al.

OTHER PUBLICATIONS

Sariyildiz et al. "On the Explicit Robust Force Control via Disturbance Observer" IEEE Transactions on Industrial Electronics, vol. 62, No. 3, Mar. 2015 [retrieved on Feb. 18, 2022] (Year: 2015).*

(Continued)

*Primary Examiner* — Rehana Perveen
*Assistant Examiner* — Alfred H B Wechselberger
(74) *Attorney, Agent, or Firm* — True Shepherd LLC; Andrew C. Cheng

(57) ABSTRACT

A control method for converting time-varying system into a time-invariant system, comprises: using $(n-1)^{th}$ to $0^{th}$ order signals of an $n^{th}$-order time-varying, system as feedback to set up a closed loop control for the time-varying system; acquiring real-time values of the coefficients in each order of the time-varying system through a sensor, and calculating variations between the real-time values and the initial values of the coefficients in each order through a controller; amplifying and summing the parameters of every order to obtain a measured disturbance; inputting the measured disturbance, a control signal from a controller and an $n^{th}$-order signal into an extended state observer through to estimate the rest disturbance; summing up the measured and estimated disturbances to obtain total disturbances; and adjusting the above parameters in each order through the controller to convert the time-varying system into the tune-invariant system.

5 Claims, 6 Drawing Sheets

(56) References Cited

OTHER PUBLICATIONS

Bertoluzzo et al. "Performance analysis of a servo system with high-bandwidth torque disturbance observer" 7th International Workshop on Advanced Motion Control. Proceedings (Cat. No. 02TH8623), 2002, pp. 110-115, doi: 10.1109/AMC.2002.1026900 [retrieved on Feb. 19, 2022] (Year: 2002).*
Ohnishi et al. "Motion Control for Advanced Mechatronics" IEEWASME Transactions on Mechatronics, vol. 1, No. 1, Mar. 1996 [retrieved on Feb. 18, 2022] (Year: 1996).*
Madonski et al. "Method of Sensor Noise Attenuation in High-Gain Observers—Experimental Verification on Two Laboratory Systems" 2012 IEEE International Symposium on Robotic and Sensors Environments Proceedings, 2012, pp. 121-126, doi: 10.1109/ROSE.2012.6402616 [retrieved on Feb. 18, 2022] (Year: 2012).*
Benmansour et al. "Extended State Observer Based Control of Attitude Stabilization for Flexible Spacecraft with Solar Pressure and Slosh Disturbances" The 5th International Conference on Electrical Engineering—Boumerdes (ICEE-B) Oct. 29-31, 2017, Boumerdes, Algeria [retrieved on Feb. 19, 2022] (Year: 2017).*

* cited by examiner

CONTROL METHOD FOR CONVERTING TIME-VARYING SYSTEM INTO TIME-INVARIANT SYSTEM

CROSS-REFERENCE TO RELATED APPLICATIONS

This application is claims priority to Chinese Patent Application No. 201810966248.1 with a filing date of Aug. 23, 2018. The content of the aforementioned application, including any intervening amendments thereto, is incorporated herein by reference.

TECHNICAL FIELD

The disclosure relates to the technical field of automatic control, and particularly to a method for converting lime-varying system into time-invariant system.

BACKGROUND OF THE PRESENT INVENTION

More than 90% of the control systems in the industry adopt the PID (Proportional-Integral-Derivative) control algorithm. For time-varying systems, the PID control algorithm can obtain excellent control effects after adjusting parameter. However, when the model parameters change, the state changing rate will also change after the same control quantity acts on the control object, which makes the control system performance worse. Although the fuzzy, intelligent and robust control methods can improve the control system performance to a certain extent, it is difficult to apply them in high-speed precision motion control for the complexity of the algorithm.

The active disturbance rejection control algorithm is an effective method to eliminate the disturbance. By considering the model error and the external disturbance as a whole, the disturbance can be suppressed to some extent, hut the active disturbance rejection control algorithm will be affected by the bandwidth of the observer and the bandwidth of the control system, which leads to a lot of trouble in application.

For example, for the $n^{th}$-order control system $a_n X^{(n)} + a_{n-1} X^{(n-1)} + \ldots + a_2 X^{(2)} + a_1 X^{(1)} + a_2 x = u$, where x is the state variable, the $x^{(1)}$ is the $i^{th}$-order derivative of the state variable, the $a_1$ is the coefficient of $i^{th}$-order derivative, and u is the control quantity. When the model parameters change, the following formula will be obtained:

$$(a_n + \Delta a_n)x^{(n)} + (a_{n-1} + \Delta a_{n-1})x^{(n-1)} + \ldots + (a_2 + \Delta a_2)x^{(2)} + (a_1 + \Delta a_1)x^{(1)} - (a_0 + \Delta a_0)x = u$$

The prior art mainly adopts the Taylor expansion to perform robust control on the model.

SUMMARY OF PRESENT INVENTION

The main object of the disclosure is to provide a control method for converting a time-varying system into a time-invariant system, aiming to convert a time-varying system into a time-invariant system by means of compensation, eliminate the effects of parameters changes and improve the stability of the linear control system.

In order to realize above purposes, a control method for converting a time-varying system into a time-invariant system provided in this disclosure, comprising the following steps:

S1: using $(n-1)^{th}$ to $0^{th}$ order signals of an $n^{th}$-order time-varying system as feedback to set up a closed loop control for the time-varying system, wherein initial values of coefficients in each order $a_n \sim a_0$ are $a'_n \sim a'_0$;

S2: acquiring real-time values of the coefficients in each order of $a_n^r \sim a_0^r$ of the time-varying system through a sensor, and calculating variations $\Delta a_n \sim \Delta a_0$ between the real-time values and the initial values of the coefficients in each order through a controller.

S3: amplifying the $n^{th}$-order coefficient $a_n$ with $$1 + \frac{\Delta a_n}{a_n^*}$$

as a gain through the controller;

S4: amplifying the $(n-1)^{th}$ to $0^{th}$ order coefficients $a_{n-1} \sim a_0$ respectively with $$a_i^* \frac{\Delta a_n}{a_n^*} - \Delta a_i$$

as a gain through the controller wherein I is an integer ranging from 0 to n-1. and then summing all resulting coefficients to obtain a measured disturbance;

S5: inputting the measured disturbance, a control signal from the controller and an $n^{th}$-order signals into an extended state observer to estimate the rest disturbances;

S6: summing up the measured disturbance in step S4 and estimated disturbance in step S5 to obtain total disturbances, multiplying the total disturbances by a reciprocal of a transfer function transferring the $n^{th}$-order coefficient to a control force to obtain a product, then figuring out a difference between the product and the $n^{th}$-order coefficient amplified in step S3 to act on the time-varying system; and S7: adjusting the above coefficients in each order through the controller to convert the time-varying system into the time-invariant system.

Preferably, a varying part of the time-varying system is compensated by the measured disturbance in step S4 and the estimated disturbance in step S5.

Preferably, the time-varying system is equivalent to the time-invariant system with time-invariant parameter.

Preferably, the $(n-1)^{th}$ to $0^{th}$ order coefficients are measured or estimated by a model of the time-varying system.

Preferably, the extended state observer is adopted to estimate rest disturbance except the measured disturbance and the measured disturbance along with the rest disturbance compensates the total disturbances.

Preferably, if a total disturbances bandwidth is less than ⅓ of the measured bandwidth, the measured disturbance is set to be 0 and the estimated disturbance obtained from the extended state observer compensates the total disturbances directly.

The technical solution of the present disclosure has the following advantages over the prior art:

The technical solution of the present disclosure, aimed at the $n^{th}$-order system, considers the $n^{th}$ derivative of the state variable as the quantity to be determined, and the $(n-1)^{th}$ order to the $0^{th}$ derivative of the state variables are all known quantities. The technical solution of the disclosure adopts ideas of the disturbance estimation and compensation in the active disturbance rejection control, and by means of double compensation by measured and estimated disturbances, fully utilizes the measured disturbance to compensate most of the disturbances. The extended state observer (ESO) further compensates the uncertain part of the model, which not only fully compensates the disturbance error, but also avoids the noise interference caused by the observation bandwidth. After the compensation, the time-varying system is transformed into a time-invariant system and the control system is equivalent to a constant system with constant parameters. The change regulation between the equivalent control quantities to output remains constant eliminating the effects of parameter changes and improving the linear control system performance. When the total disturbance bandwidth is less than ⅓ of the measured disturbance bandwidth, which means the total disturbance amount is not particularly large, the measured disturbance is set to be 0, which simplifies original algorithm to the active disturbance rejection control algorithm of ESO disturbance estimation compensation.

DESCRIPTION OF THE DRAWINGS

In order to make the technical solutions in the disclosure or in the prior art described more clearly, the accompanying drawings needed in the embodiments or in the prior art will be introduced concisely as follows. Obviously, the drawings described below are only some embodiments according to the disclosure, and for one of ordinary skills, more drawings will be obtained in the art based on the structures described in the drawings without paying any creative work.

The realization of the objects of the disclosure, functional features and advantages of the present disclosure will be further described with reference to the accompanying drawings.

DETAILED DESCRIPTION OF PREFERRED EMBODIMENTS

The technical solutions in present disclosure will now be described more clearly and fully with reference to the accompanying drawings in embodiments as following. Obviously, this disclosure may, however, be embodied in many different forms and should not be construed as limited to the embodiments set forth herein. It is appreciated that more embodiments will be obtained by one of ordinary skills in the art based, on the embodiments described herein without paying any creative work, and all these embodiments should fall in the scope of this invention.

It should be noted that any directional indications involved in the embodiments of the disclosure, such as "upper", "lower", "left", "right", "front", "back", etc., are only used to explain the relative positional relationship and the motion situation between components in a certain posture as shown in accompanying drawings. The directional indications will change accordingly if the certain posture changes.

The block diagrams of the present invention are corresponding to the expressions. When the direction of the measured signal changes, it depends on the expressions that whether the expression in the extended state observer would standardize the estimation, namely divide by the highest order expression coefficient an expressed by a product factor $b=1/a_n$, whether the signs in the block diagrams would change and whether the scale factor, b or 1/b, would change. A completely equivalence can still be expressed through the formula.

In addition, any description involved "first" and "second" in the embodiments of the disclosure is merely for the purpose of description and can not be construed as indicating or implying a relative importance or the number of, technical features. Thus, features defined with "first" and "second" may comprise at least one feature expressly or impliedly. Moreover, the various embodiments in technical solutions can be combined with each other, which have to base on the precondition, that ordinary skills in the art can realize the combinations. When a combination of technical solution is in contradictory or is impossible to realize, the combination should be considered as not exist and should not fall in the scope of the claimed protection of the invention.

Figure 1:
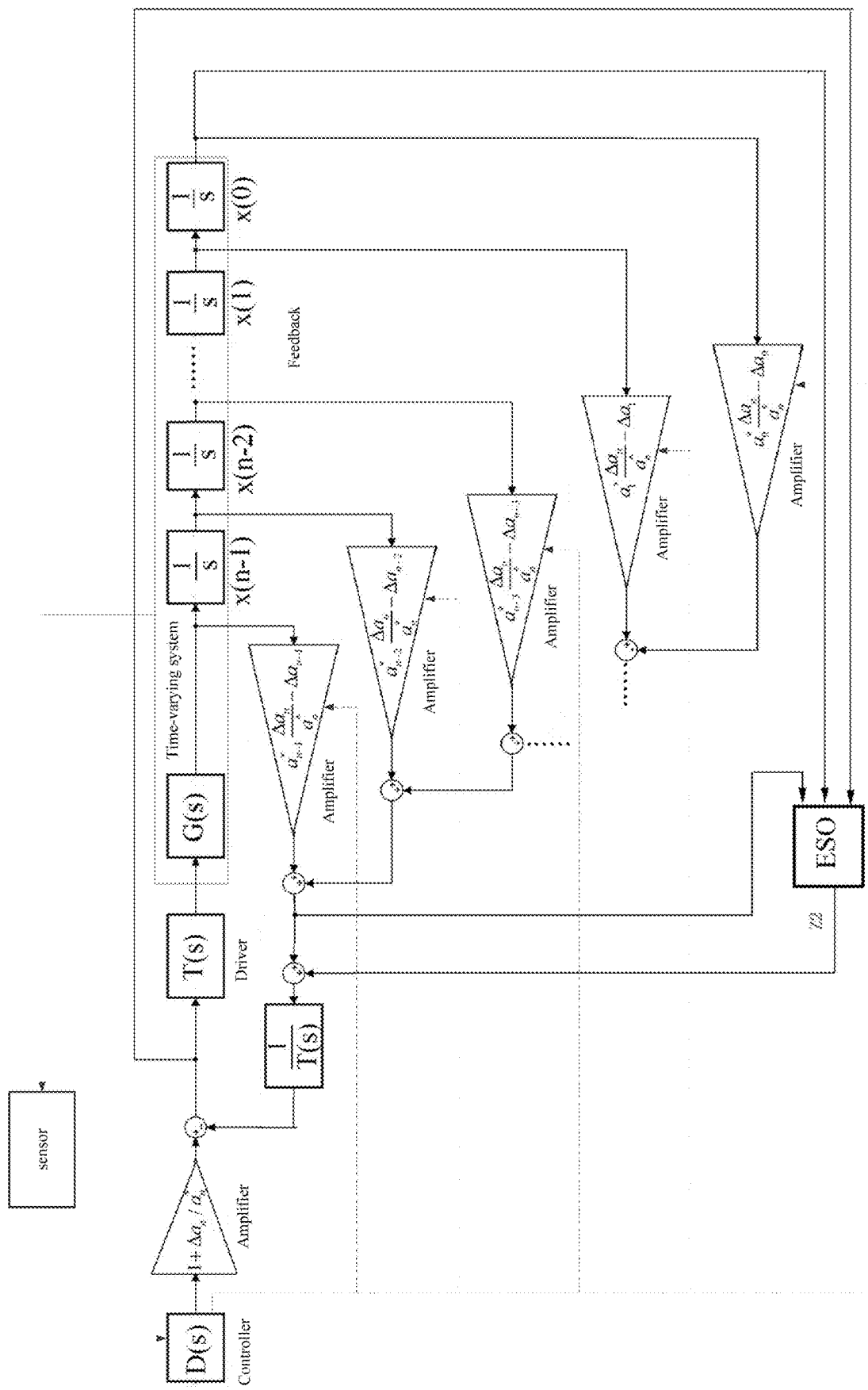
FIG. 1 is a working principle diagram of the control method according to the present disclosure.

Referring to FIG. 1, a control method for converting a time-varying system into a time-invariant system is provided in this disclosure, comprising the following steps:

S1: using $(n-1)^{th}$ to $0^{th}$ order signals of an $n^{th}$-order time-varying system as feedback to set up a closed loop control for the time-varying system, wherein initial values of coefficients in each order $a_n$~$a_0$ are $a'_n$~$a'_n$;

S2: acquiring real-time values of the coefficients in each order $a_n{}^r$~$a_0{}^r$ or the time-varying system through a sensor, and calculating variations $\Delta a_n$~$\Delta a_0$ between the real-time values and the initial values of the coefficients in each order through a controller, S3: amplifying the $n^{th}$-order coefficient $a_n$ with $$1 + \frac{\Delta a_n}{a_n^*}$$

as a gain through the controller;

S4: amplifying the $(n-1)^{th}$ to $0^{th}$ order coefficients $a_{n-1}$~$a_0$ respectively with $$a_i^* \frac{\Delta a_n}{a_n^*} - \Delta a_i$$

as a gain through the controller wherein I is an integer ranging from 0 to n−1, and then summing all resulting coefficients to obtain a measured disturbance;

S5: inputting the measured disturbance, a control signal from the controller and an $n^{th}$-order signals into an extended state observer to estimate the rest disturbances $z_2$;

S6: summing up the measured disturbance in step S4 and estimated disturbance in step S5 to obtain total disturbances, multiplying the total disturbances by a reciprocal of a transfer function transferring the $n^{th}$-order coefficient to a control force by the total disturbances to obtain a product, then figuring out a difference between the product and the $n^{th}$-order coefficient amplified in step S3 to act on the time-varying system; and S7: adjusting the above coefficients in each order through the controller to convert the time-varying system into the time-invariant system.

Preferably, a varying part of the time-varying system in the present disclosure is compensated by the measured disturbance in step S4 and the estimated disturbance in step S5. After compensation by above method, the time-varying system is equivalent to the time-invariant system with time-invariant parameter. Coefficients from $(n-1)^{th}$ to $0^{th}$ order can be measured or estimated according to a model of the time-varying system. The extended state observer is adopted to estimate the rest disturbance except the measured disturbance and the measured disturbance along with the rest disturbance compensates the total disturbances, if the total disturbance bandwidth is less than ⅓ of the measured bandwidth, the measured disturbance is set to be 0 and the estimated disturbance of the extended state observer compensates the total disturbances directly.

Embodiment 1

Figure 2:
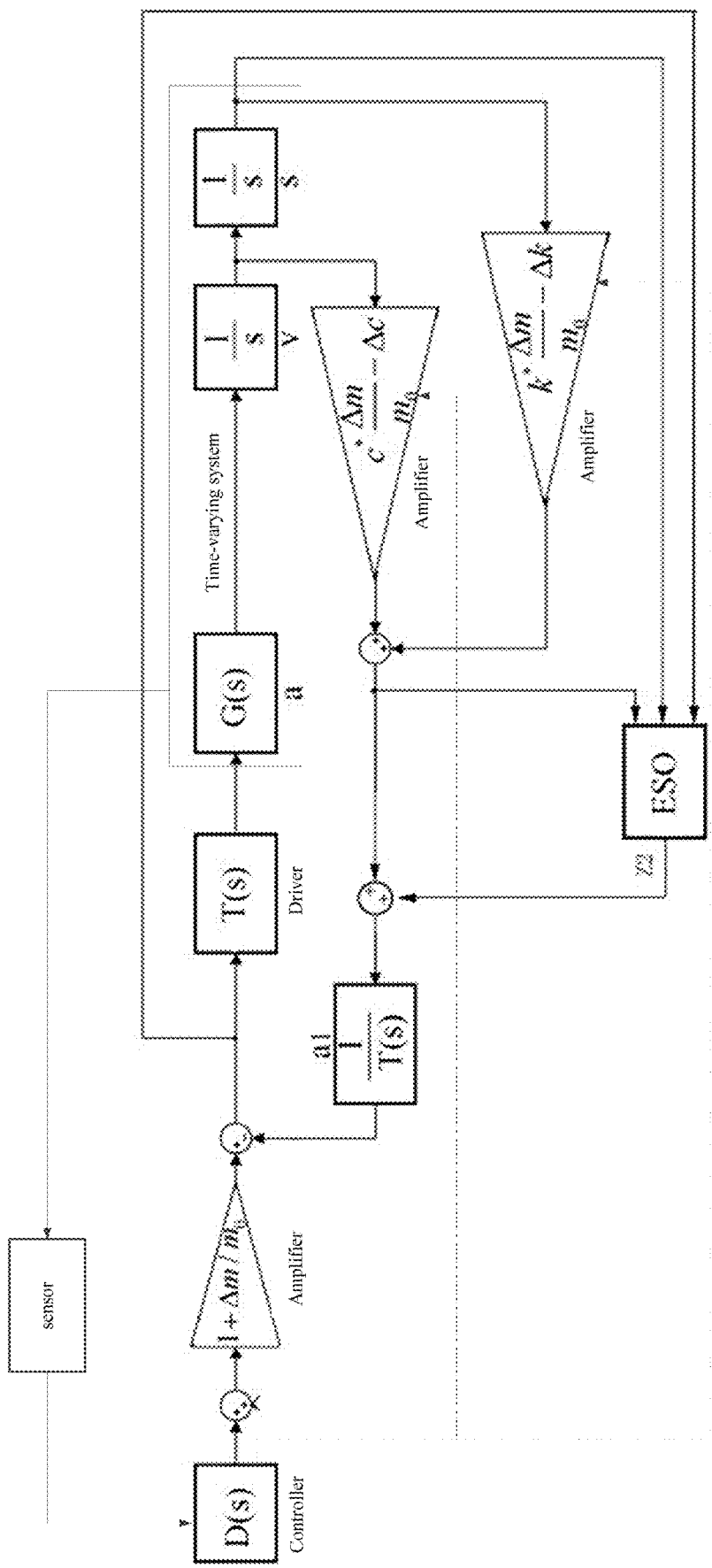
FIG. 2 is a working principle diagram of the control method in Embodiment 1 according to the present disclosure.

Referring to FIG. 2, the embodiment in the present invention takes a second-order system generally applied in mechanical engineering as an example, and a specific expression of the control system is:

$$m_0 \ddot{x}(t) + c_0 \dot{x}(t) + k_0 x(t) = u_0(t) \quad (1)$$

When a parameter of the controlled object (time-varying system) changes, the specific expression will become:

$$(m_0 + \Delta m)\ddot{x}(t) + (c_0 + \Delta c)\dot{x}(t) + (k_0 + \Delta k)x(t) = u_0(t) \quad (2)$$

Since a control quantity $u_0(t)$ is obtained according to a deviation and is not directly related to the parameter of the controlled object, the changes of the parameter will lead to changes in the speed of the state change. In order to keep the speed of the state change unchanged, the control quantity needs to be compensated.

Multiply both sides of expression (1) by $$\frac{m_0 + \Delta m}{m_0}$$

to get the following expression:

$$\frac{m_0 + \Delta m}{m_0} m_0 \ddot{x}(t) + \frac{m_0 + \Delta m}{m_0} c_0 \dot{x}(t) + \frac{m_0 + \Delta m}{m_0} k_0 x(t) = \frac{m_0 + \Delta m}{m_0} u_0(t)$$

Organize the above formula to get the following expression:

$$(m_0 + \Delta m)\ddot{x}(t) + c_0 \dot{x}(t) + k_0 x(t) = \quad (3)$$
$$\frac{m_0 + \Delta m}{m_0} u_0(t) - \frac{\Delta m}{m_0} c_0 \dot{x}(t) - \frac{\Delta m}{m_0} k_0 x(t)$$

Equivalently exchange expression (3) to obtain the following expression:

$$(m_0 + \Delta m)\ddot{x}(t) + (c_0 + \Delta c)\dot{x}(t) + (k_0 + \Delta k)x(t) = \quad (4)$$
$$\frac{m_0 + \Delta m}{m_0} u_0(t) - \left(\frac{\Delta m}{m_0} c_0 - \Delta c\right)\dot{x}(t) - \left(\frac{\Delta m}{m_0} k_0 - \Delta k\right)x(t)$$

Compared with the expression (3), the expression (4) increases the damping and stiffness changes on the left side of the expression, and increases the stiffness and damping force on both sides. Through the equivalent exchange from the expression (3) to the expression (4), an equivalent form after the parameter changes can be obtained from the original system.

Compared with the expression (2), the expression (4) needs to multiply the original control quantity by $$\frac{m_0 + \Delta m}{m_0},$$

subtract a product that multiply the other low-order quantities by the original parameter $$\frac{\Delta m}{m_0},$$

and subtract the change amount of the parameter as feedback to finally eliminates the impact of each parameter changes.

Let $$b = \frac{1}{m_0 + \Delta m},$$

and the second order ESO which could estimates the speed and the disturbance is:

$$\dot{z}_1 = z_2/b + 2\omega_o(\dot{r} - z_1) +$$
$$b\left\{u - \left[\left(\frac{\Delta m}{m_0} c_0 - \Delta c\right)\dot{x}(t) - \left(\frac{\Delta m}{m_0} k_0 - \Delta k\right)x(t)\right]\right\}$$
$$\dot{z}_2 = \omega_o^2(\dot{r} - z_1)/b$$

When the speed is in accurate measure, the ESO could be reduced-order. The first order ESO which could only estimate the disturbance is:

$$\dot{z}_1 = -\omega_o z_1 - \omega_o^2 \theta_1 - \omega_o\left(\frac{\Delta m}{m_0} c_0 - \Delta c\right)\dot{x}(t) - \left(\frac{\Delta m}{m_0} k_0 - \Delta k\right)x(t)$$
$$z_2 = (z_1 + \omega_o \theta_1)/b$$

Figure 3:
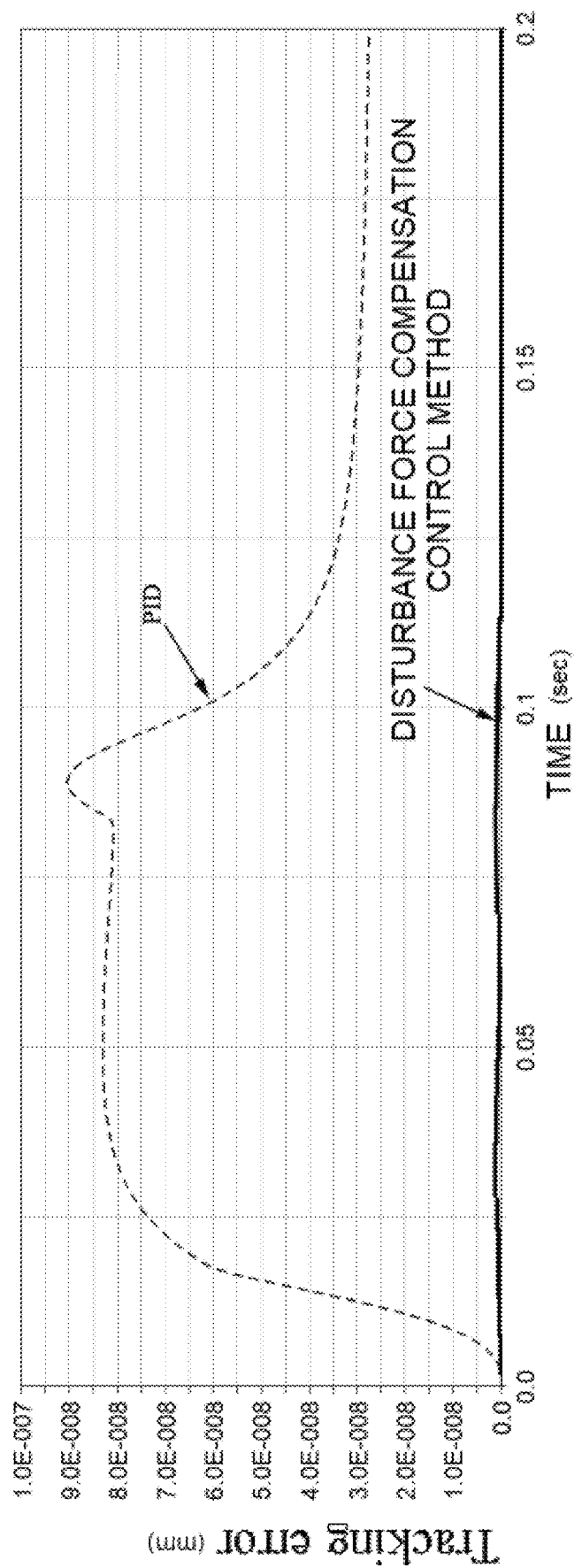
FIG. 3 is a position tracking error curves comparison diagram between traditional PID method and disturbance force compensation control method of spring damping force compensation in Embodiment 1 according to the present disclosure.
Figure 4:
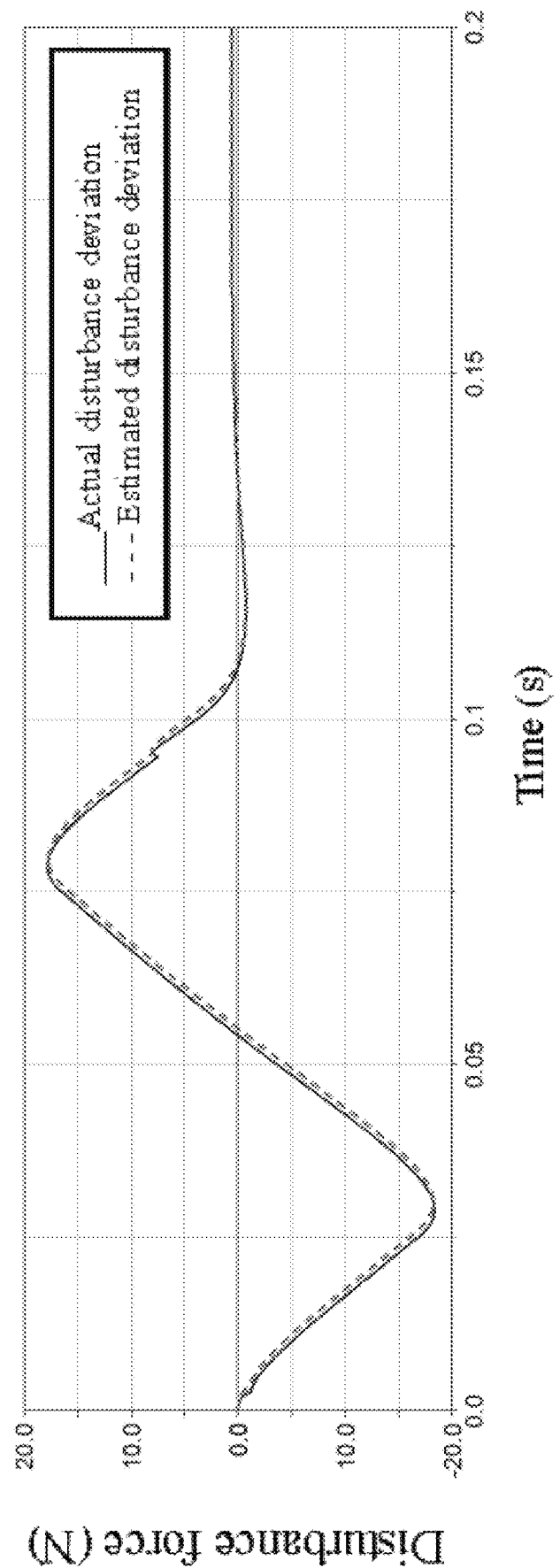
FIG. 4 is a disturbance resulting diagram caused by the, parameters deviation, of accurate estimation model of the extended state observer in Embodiment 1 according to the present disclosure.
Figure 5:
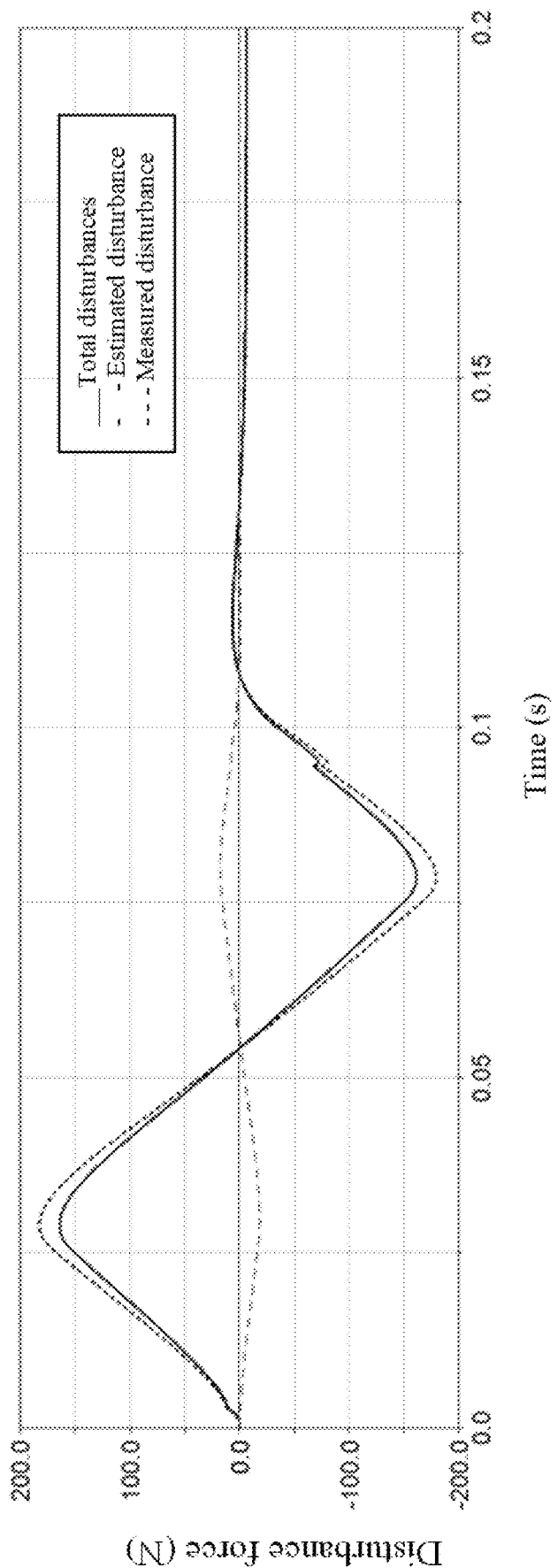
FIG. 5 is a total disturbance resulting diagram obtained from measured disturbance plus estimated disturbance in Embodiment 1 according to the present disclosure.
Figure 6:
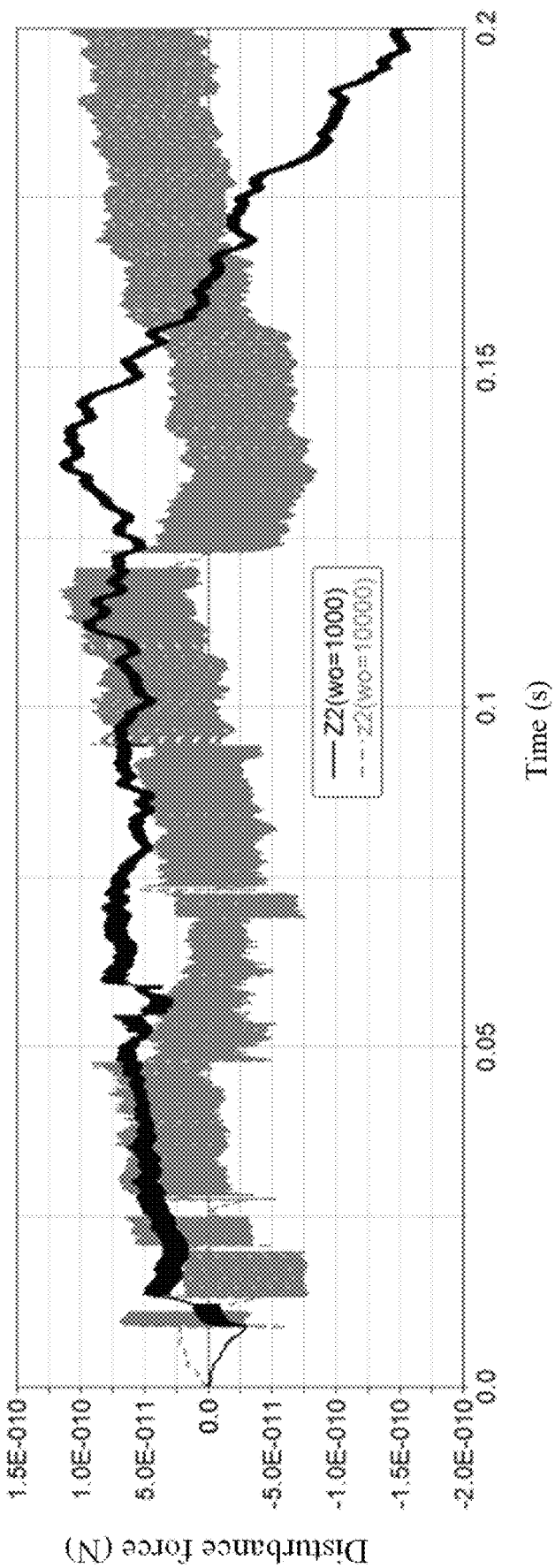
FIG. 6 is a disturbance resulting diagram of ESO estimation in Embodiment 1 according to the present disclosure.

As the position tracking error -curve comparison shown in FIG. 3, when the traditional ND method and the disturbance force compensation control method using spring damping force compensation are adopted, the maximum error is reduced from $9e^{-8}$ to $9e^{-9}$, which is reduced by an order of magnitude When the stiffness damping parameter exists a deviation $(-0.1\,k, -0.1\,c)$, the actual stiffness damping parameter is only 0.9 times as much as the design value. At this time, the extended state observer accurately estimates the disturbances caused by the deviation of the model parameters as shown in FIG. 4. In the Embodiment 1, the sum of measured disturbance (1 k, 1 c calculated value) plus the estimated disturbance (−0.1 k, −0.1 c caused by deviation) is equal to the total disturbance (0.9 k, 0.9 c actual value) as shown in FIG. 5. When there is no change in the parameters, the disturbance estimated by ESO is close to 0 as shown in FIG. 6. However, with the increase of the observer width, the noise will increase. Therefore, the present invention compensates the main disturbance by using the measured firstly to avoid the noise caused by the high-frequency disturbance observation of the observer.

Embodiment 2

The second order system of dual-mechanical arm is taken as an example in the present invention, the equation expression of specific joint control, is:

$$J_1\ddot{\theta}_1 B_1\dot{\theta}=T_1 \quad (5)$$

The changes of the joint pose lead to the changes of the inertia of joint 1, the expression is:

$$(J_1+\Delta J_1)\ddot{\theta}_1+B_1\dot{\theta}=T_1 \quad (6)$$

By multiplying both sides of the original model by $$\frac{J_1+\Delta J_1}{J_1},$$

the following expression can be obtained:

$$J_1\frac{J_1+\Delta J_1}{J_1}\ddot{\theta}_1+B_1\frac{J_1+\Delta J_1}{J_1}\dot{\theta}=\frac{J_1+\Delta J_1}{J_1}T_1 \quad (7)$$

Organize the expression (7) into a model with a parameter changed to obtain the following expression:

$$(J_1+\Delta J_1)\ddot{\theta}_1+B_1\dot{\theta}=\frac{J_1+\Delta J_1}{J_1}T_1-B_1\frac{\Delta J_1}{J_1}\dot{\theta} \quad (8)$$

The value of ΔB in second order system model of dual-mechanical arm in the embodiment is 0.

As can be seen in expression (8), the compensation part of the measured disturbance is $$-B_1\frac{\Delta J_1}{J_1}\dot{\theta}.$$

By adopting extended state observer, assign b the value $$\frac{J_1}{J_1+\Delta J_1}$$

to further compensate the disturbances.

The second order ESO which could estimates the speed and the disturbance is:

$$\dot{z}_1 = z_2/b + 2\omega_o(\theta_1-z_1)+b\left(u-B_1\frac{\Delta J_1}{J_1}\dot{\theta}_1\right)$$

$$\dot{z}_2 = \omega_o^2(\theta_1-z_1)/b$$

When the speed is in accurate measure, the ESO could be reduced-order.

The first order ESO which could only estimates the disturbance is:

$$\dot{z}_1 = -\omega_o z_1 - \omega_o^2 \theta_1 - \omega_o B_1\frac{\Delta J_1}{J_1}\bigg/(J_1+\Delta J_1)$$

$$z_2 = (z_1+\omega_o\theta_1)/b$$

Finally, multiply the sum of the measured disturbance plus the estimated disturbances by the reciprocal of transfer function transferring, the control quantity to the driving force, and the result of which can compensate the signals of the control system, thereby converting the time-varying system into the time-invariant system and handling the interference of the model and the external environment.

The above embodiments are only preferred embodiments of the present invention, and are not intended to limit the scope of the invention, and any equivalent structural transformations based on the present specification and the drawings or directly or indirectly utilized in other related technical fields fall in the scope of patent protection of the present invention.

We claim:

1. A control method for converting a time-varying system that is defined by a second order system of a dual-mechanical arm into a time-invariant system, the second order system of the dual-mechanism arm being applied to a joint of the dual-mechanical arm, comprising the following steps:
   S1: using $(n-1)^{th}$ to $0^{th}$ order signals of an $n^{th}$-order time-varying system as feedback to set up a closed loop control for the time-varying system, wherein initial values of coefficients in each order $a_n$~$a_0$ are $a^*_n$~$a^*_0$, wherein for the second order system of the dual-mechanical arm, n is 2, and the second order system of the dual-mechanical arm is expressible in the following equation:

$$J_1\ddot{\theta}_1+B_1\dot{\theta}_1+0\times\theta_1=T_1$$

where $a_2=J_1$, $a_1=B_1$, $a_o=0$, and $T_1$ indicates a control quantity of the second order system; $J_1$ indicates the coefficient of the $2^{nd}$ order that is $a_2$ and represents moment of inertia of the dual-mechanical arm, $\theta_1$ indicates a state variable that represents an angle of the dual-mechanical arm, $\dot{\theta}_1$ being angular velocity, $\ddot{\theta}_1$ being angular acceleration; and $B_1$ indicates the coefficient of the $1^{st}$ order that is $a_0$ and represents a damping coefficient of the dual-mechanism arm;
   S2: acquiring real-time values of the coefficients in each order $a_n^r$~$a_0^r$ of the time-varying system through a sensor, and calculating variations $\Delta a_N$~$\Delta a_0$ between the real-time values and the initial values of the coefficients in each order through a controller;
   S3: amplifying the $n^{th}$-order coefficient $a_n$ with $$1+\frac{\Delta a_n}{a_n^*}$$

as a gain through the controller;

S4: amplifying the $(n-1)^{th}$ to $0^{th}$ order coefficients $a_{n-1} \sim a_0$ respectively with $$a_i^* \frac{\Delta a_n}{a_n^*} - \Delta a_i$$

as a gain through the controller wherein i is an integer ranging from 0 to n−1, and then summing all resulting coefficients to obtain a measured disturbance;

S5: inputting the measured disturbance, a control signal from the controller and an $n^{th}$-order signal into an extended state observer to estimate the rest disturbance;

S6: summing up the measured disturbance in step S4 and estimated disturbance in step S5 to obtain total disturbances, multiplying the total disturbances by a reciprocal of a transfer function transferring the $n^{th}$-order coefficient to a control force to obtain a product, then figuring out a difference between the product and the $n^{th}$-order coefficient amplified in step S3 to act on the time-varying system; and S7: adjusting the above coefficients in each order through the controller to convert the time-varying system into the time-invariant system.

2. The control method according to claim 1, wherein a varying part of the time-varying system is compensated by the measured disturbance in step S4 and the estimated disturbance in step S5.

3. The control method according to claim 1, wherein the $(n-1)^{th}$ to $0^{th}$ order coefficients are measured or estimated according to a model of the time-varying system.

4. The control method according to claim 1, wherein the extended state observer is adopted to estimate the rest disturbance except the measured disturbance and the measured disturbance along with the rest disturbance compensates the total disturbances.

5. The control method according to claim 2, wherein if a total disturbance bandwidth is less than ⅓ of the measured bandwidth, the measured disturbance is set to be 0 and the estimated disturbance of the extended state, observer compensates the total disturbances directly.

* * * * *